US006761656B2

United States Patent
King et al.

(10) Patent No.: US 6,761,656 B2
(45) Date of Patent: Jul. 13, 2004

(54) OVER-RUNNING CLUTCH PULLEY WITH CLUTCH CARTRIDGE

(75) Inventors: Randall King, Ann Arbor, MI (US); Katsumi Furutani, Ann Arbor, MI (US); Robert Frayer, Gregory, MI (US); Steve Russell, Saline, MI (US); Mary-Jo Liston, Whitmore Lake, MI (US); Jared Taketa, Indianapolis, IN (US)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/160,315

(22) Filed: May 31, 2002

(65) Prior Publication Data

US 2003/0224886 A1 Dec. 4, 2003

(51) Int. Cl.[7] .............................................. F16H 59/00
(52) U.S. Cl. ........................................ 474/74; 192/415
(58) Field of Search .............................. 474/69, 70, 74, 474/190; 192/415, 75, 107 T, 107 M

(56) References Cited

U.S. PATENT DOCUMENTS

| | | | |
|---|---|---|---|
| 1,615,804 A | | 1/1927 | Starkey |
| 2,588,187 A | * | 3/1952 | Weiser .......................... 475/12 |
| 3,149,706 A | | 9/1964 | Mason et al. |
| 3,171,523 A | | 3/1965 | Shoquist |
| 3,393,779 A | | 7/1968 | Sacchini |
| 3,685,622 A | | 8/1972 | Baer et al. |
| 3,712,766 A | | 1/1973 | Jones |
| 3,738,463 A | | 6/1973 | Kunst et al. |
| 4,440,280 A | | 4/1984 | Hagihara |
| 4,460,076 A | * | 7/1984 | Yamada ........................ 192/35 |
| 4,869,357 A | | 9/1989 | Batchelder |
| 5,120,279 A | * | 6/1992 | Rabe ........................... 474/161 |
| 5,139,463 A | | 8/1992 | Bytzek et al. |
| 5,598,913 A | * | 2/1997 | Monahan et al. ......... 192/41 S |
| 6,083,130 A | | 7/2000 | Mevissen et al. |
| 6,095,301 A | | 8/2000 | Fujiwara et al. |
| 6,116,393 A | * | 9/2000 | Ooitsu et al. .................. 192/45 |
| 6,257,385 B1 | | 7/2001 | Ouchi |
| 6,394,247 B1 | * | 5/2002 | Monahan et al. ......... 192/41 S |
| 6,394,248 B1 | * | 5/2002 | Monahan et al. ......... 192/41 S |

* cited by examiner

*Primary Examiner*—David A. Bucci
*Assistant Examiner*—Vicky A. Johnson
(74) *Attorney, Agent, or Firm*—Brinks Hofer Gilson & Lione

(57) ABSTRACT

The over-running clutch pulley of the preferred embodiments of the invention includes a sheave member defining a sheave input surface adapted to engage an input device, a hub member defining a hub output surface adapted to engage an output device, and a clutch cartridge. The clutch cartridge includes a sheave engagement sleeve coupled to a sheave cartridge surface of the sheave member, a hub attachment sleeve coupled to a hub cartridge surface of the hub member, and a coil spring having the first end attached to the hub attachment sleeve. The coil spring is adapted to engage the sheave engagement sleeve upon the acceleration of the sheave member in a first rotational direction relative to the hub member, and to disengage the sheave engagement sleeve upon the deceleration of the sheave member in the first rotational direction relative to the hub member.

12 Claims, 2 Drawing Sheets

OVER-RUNNING CLUTCH PULLEY WITH CLUTCH CARTRIDGE

TECHNICAL FIELD

This invention relates generally to devices in the over-running clutch field, and more specifically to an improved over-running clutch pulley for use with an accessory device driven by an automotive engine with a belt drive.

BACKGROUND

During the operation of an automotive engine, a drive belt is typically used to power and operate various accessory devices. One of these accessory devices is typically an automotive alternator, which provides electrical power to the automobile. While several arrangements of drive belts are in use, the serpentine arrangement, which drives several accessory devices, is currently most favored. Serpentine arrangements typically include a drive pulley connected to the crankshaft of the engine (the "output device") and a drive belt trained about the drive pulley. The drive belt is also trained about one or more conventional driven pulleys, which are connected to the input shafts of various accessories devices (the "input device").

Most conventional driven pulleys are made from a one-piece design with no over-running capabilities. In other words, the conventional driven pulleys are rigidly mounted to the input shaft and are incapable of allowing relative rotational movement between any section of the driven pulley and the input shaft. As a result of the lack of any over-running capabilities and of the generation of significant inertia by the accessory, relative slippage between the drive belt and the driven pulley may occur if the drive belt suddenly decelerates relative to the input shaft. The relative slippage may cause an audible squeal, which is annoying from an auditory standpoint, and an undue wear on the drive belt, which is undesirable from a mechanical standpoint.

In a typical driving situation, the drive belt may experience many instances of sudden deceleration relative to the input shaft. This situation may occur, for example, during a typical shift from first gear to second gear under wide open throttle acceleration. This situation is worsened if the throttle is closed or "backed off" immediately after the shift. In these situations, the drive belt decelerates very quickly while the driven pulley, with the high inertia from the accessory device, maintains a high rotational speed, despite the friction between the drive belt and the driven pulley.

In addition to the instances of sudden deceleration, the drive belt may experience other situations that cause audible vibration and undue wear. As an example, a serpentine arrangement with conventional driven pulleys may be used with an automobile engine that has an extremely low idle engine speed (which may increase fuel economy). In these situations, the arrangement typically experiences "belt flap" of the drive belt as the periodic cylinder firing of the automotive engine causes the arrangement to resonate within a natural frequency and cause an audible vibration and undue wear on the drive belt.

The disadvantage of the conventional driven pulleys, namely the audible squeal, the undue wear, and the vibration of the drive belt, may be avoided by the use of an over-running clutch pulley instead of the conventional driven pulley. An over-running clutch pulley allows the pulley to continue to rotate at the same rotational speed and in the same rotational direction after a sudden deceleration of the drive belt. In a way, the over-running clutch pulley functions like the rear hub of a typical bicycle; the rear hub and rear wheel of a conventional bicycle continue to rotate at the same rotational speed and in the same rotational direction even after a sudden deceleration of the pedals and crankshaft of the bicycle. An example of an over-running clutch pulley is described in U.S. Pat. No. 5,598,913 issued to the same assignee of this invention and hereby incorporated in its entirety by this reference.

Since many customers of new automobiles are demanding longer lives, with relatively fewer repairs, for their new automobiles, there is a need in the automotive field, if not in other fields, to create an over-running clutch pulley with increased wear resistance. This invention provides an over-running clutch pulley that increases wear resistance, while minimizing manufacturing costs.

DETAILED DESCRIPTION OF THE PREFERRED EMBODIMENTS

The following description of the preferred embodiments of the invention is not intended to limit the scope of this invention to these preferred embodiments, but rather to enable any person skilled in the art of over-running clutches to make and use this invention.

Figure 1:
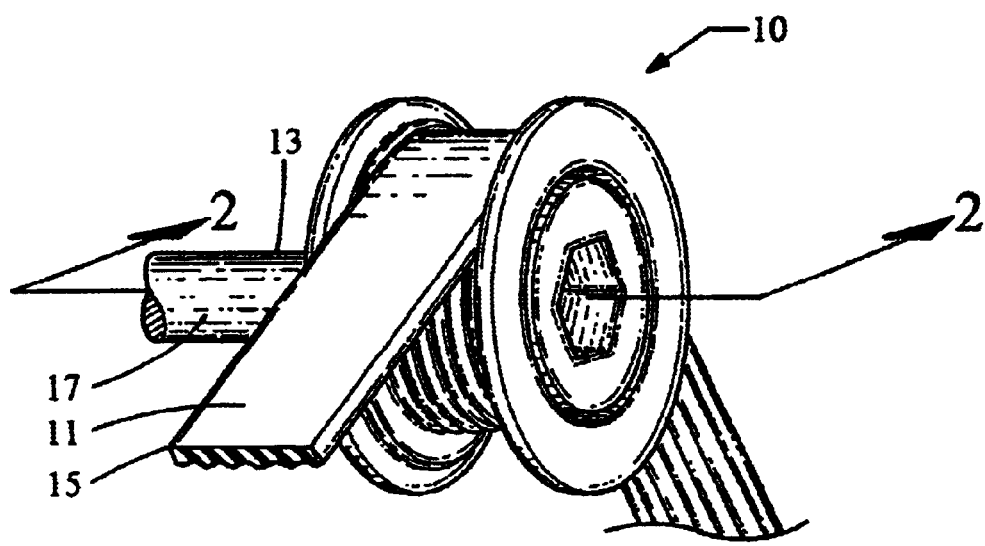
FIG. 1 is a perspective view of an over-running clutch pulley of the invention, shown with a drive belt as the input device and a cylindrical shaft as the output device.

As shown in FIG. 1, the invention includes an over-running clutch pulley 10 for rotationally engaging an input device 11 and an output device 13. The over-running clutch pulley 10 has been designed for use with a drive belt 15 as the input device 11, and with a cylindrical shaft 17 as the output device 13. More specifically, the over-running clutch pulley 10 has been particularly designed for use with a drive belt 15 with a grooved surface and a cylindrical shaft 17 of an automotive alternator. The over-running clutch pulley 10 may be used, however, in other environments, with other suitable input devices, such as smooth belt, a toothed belt, a V-shaped belt, or even a toothed gear, and with other suitable output devices, such as a polygonal shaft. Furthermore, the over-running clutch pulley 10 may be used in an environment with two devices that alternate their rotational input responsibilities, and in an environment with an "output device" that actually provides rotational input and with an "input device" that actually receives rotational input. In these alternative embodiments, the terms "input device" and "output device" are interchangeable.

Figure 2A:
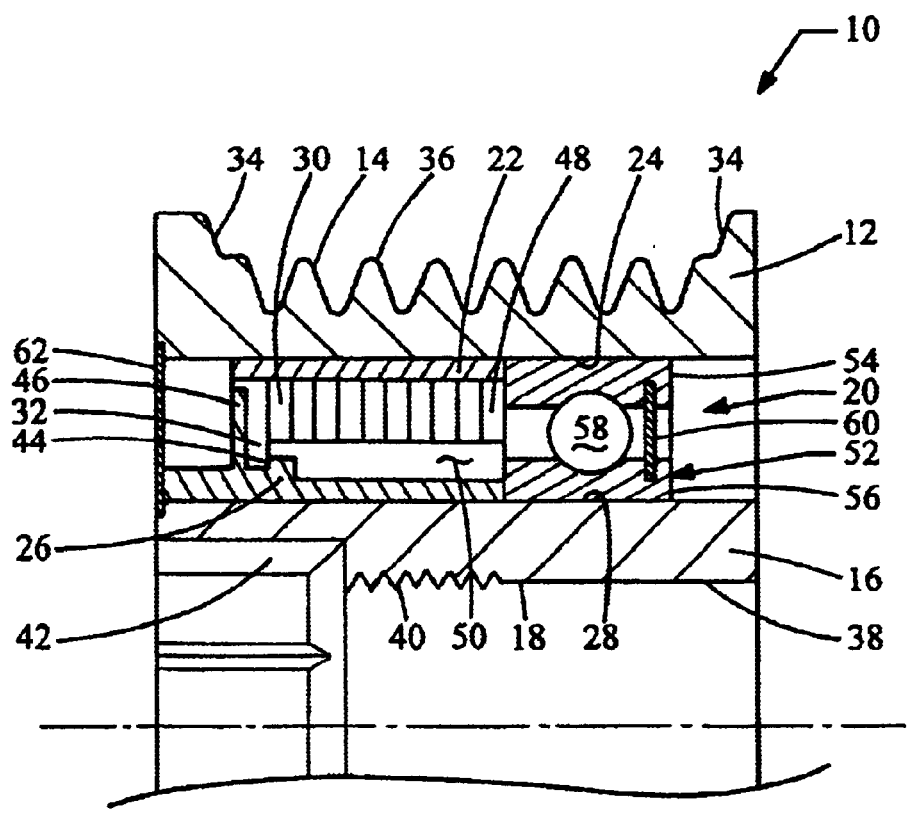
FIGS. 2A and 2B are partial cross-section views, taken along the line 2—2 of FIG. 1, of the over-running clutch pulley of the first and second preferred embodiments of the invention, respectively.
Figure 2B:
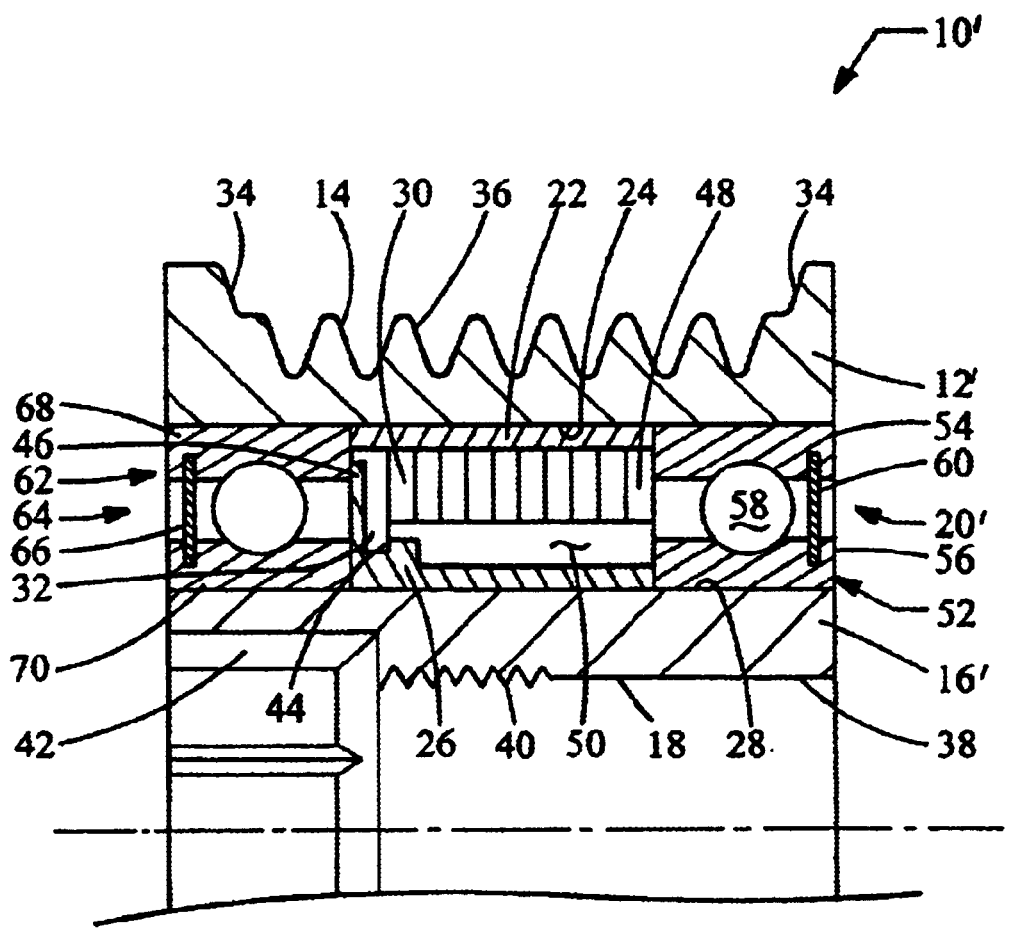

As shown if FIGS. 2A and 2B, the over-running clutch pulley 10 of the preferred embodiments of the invention includes a sheave member 12 defining a sheave input surface 14 adapted to engage the input device 11, a hub member 16 defining a hub output surface 18 adapted to engage the output device 13, and a clutch cartridge 20. The clutch cartridge 20 includes a sheave engagement sleeve 22 coupled to a sheave cartridge surface 24 of the sheave member 12, a hub attachment sleeve 26 coupled to a hub cartridge surface 28 of the hub member 16, and a coil spring 30 having first end 32 attached to the hub attachment sleeve 26. The coil spring 30 is adapted to engage the sheave engagement sleeve 22 upon the acceleration of the sheave member 12 in a first rotational direction relative to the hub member 16, and to disengage the sheave engagement sleeve 22 upon the deceleration of the sheave member 12 in the first rotational direction relative to the hub member 16. The use of the clutch cartridge 20 and the sheave engagement sleeve 22 increases the wear resistance while minimizing the manufacturing cost of the over-running clutch pulley 10.

The sheave input surface 14 of the sheave member 12 of the preferred embodiments functions to engage the drive belt. To substantially prevent rotational and axial slippage of the sheave member 12 and the drive belt, the sheave input surface 14 preferably includes two sheave input shoulders 34 and at least one sheave input groove 36. The sheave input surface 14 may alternatively include other suitable elements, such as toothed surfaces or ribbed surfaces, to engage the input device. The sheave input surface 14 is preferably outwardly directed (away from the rotational axis of the over-running clutch pulley 10) and is preferably substantially cylindrically shaped. The sheave input surface 14 is preferably made from conventional structural materials, such as plastic, and with conventional methods, but may alternatively be made from other suitable materials and from other suitable methods.

The hub output surface 18 of the hub member 16 of the preferred embodiments functions to engage the cylindrical shaft. The hub output surface 18 preferably includes a smooth section 38 (which functions to ease and center the assembly of the over-running clutch pulley 10 onto the cylindrical shaft), a threaded section 40 (which functions to substantially prevent rotation and to axially retain the hub member 16 to the cylindrical shaft), and a hexagonal section 42 (which functions to mate with an allen wrench for easy tightening and loosening of the over-running clutch pulley 10 onto and off of the cylindrical shaft). Of course, the hub output surface 18 may include other suitable elements to prevent rotational and axial slippage, to engage the cylindrical shaft, and to engage a tool for tightening or loosening the over-running clutch pulley 10 onto and off of the cylindrical shaft. The hub output surface 18 is preferably inwardly directed (toward the rotational axis of the over-running clutch pulley 10) and is preferably substantially cylindrically shaped. The hub output surface 18 is preferably made from conventional structural materials, such as plastic, and with conventional methods, but may alternatively be made from other suitable materials and from other suitable methods.

The sheave cartridge surface 24 and the hub cartridge surface 28 of the preferred embodiments function to provide engagement with the clutch cartridge 20. In the preferred embodiment, the sheave cartridge surface 24 and the hub cartridge surface 28 are substantially continuous and the hub member 16 is press-fit mounted into the clutch cartridge 20 and the clutch cartridge 20 is press-fit mounted into the sheave member 12. In alternative embodiments, non-continuous elements, such as steps or other protrusions in the axial direction, may provide axial support and engagement between the hub member 16 and the clutch cartridge 20 and between the clutch cartridge 20 and the sheave member 12. As an example, the hub member 16 and the sheave member 12 of an alternative embodiment may include radially extending shoulders or may be crimped.

The hub attachment sleeve 26 of the preferred embodiments functions to couple the coil spring 30 to the hub member 16. As described above, the hub cartridge surface 28 and the hub attachment sleeve 26 are preferably engaged with a press-fit mounting. In alternative embodiments, the hub cartridge surface 28 and the hub attachment sleeve 26 may be engaged with other suitable elements, such as splines. The hub attachment sleeve 26 preferably includes a spring insertion cavity 44, which functions to engage the first end 32 of the coil spring 30. The spring insertion cavity 44 preferably functions to restrain the first end 32 of the coil spring 30 from any rotational movement or axial movement relative to the hub attachment sleeve 26 and the hub member 16. The hub attachment sleeve 26 also preferably includes a spring retention wall 46, which functions to support the coil spring 30. The hub attachment sleeve 26 is preferably made from conventional materials, such as plastic, and with conventional materials, but may alternatively be made from other suitable materials and from other suitable methods.

The sheave engagement sleeve 22 of the preferred embodiments, like the hub attachment sleeve 26, engages the sheave cartridge surface 24 with a press-fit mounting. The sheave engagement sleeve 22 and the sheave cartridge surface 24 may alternatively be engaged with other suitable elements, such as splines. Preferably, the sheave engagement sleeve 22 extends axially from the spring retention wall 46 of the hub attachment sleeve 26 to a second end 48 of the spring coil. In this manner, the sheave engagement sleeve 22 and the hub attachment sleeve 26 preferably define a clutch cavity 50. The sheave engagement sleeve 22 is preferably made from a more wear resistant material than the sheave member 12. The sheave engagement sleeve 22 is preferably made from a conventional structural material, such as steel, and with conventional methods, but may alternatively be made from other suitable materials and from other suitable methods.

The coil spring 30 is preferably designed with a relaxed spring radial diameter that is sized slightly greater than an inner diameter of the sheave engagement sleeve 22. Thus, when fully assembled and when experiencing no rotational movement of the sheave member 12 or the hub member 16, the coil spring 30 frictionally engages with and exerts an outward force on the sheave engagement sleeve 22. Further, the coil spring 30 is preferably oriented within the clutch cavity 50 such that the coils extend axially in a second rotational direction (opposite the first rotational direction) from the first end 32 to the second end 48. With this orientation, relative rotational movement of the sheave member 12 and the hub member 16 will result in an unwinding or winding of the coil spring 30. In other words, acceleration of the sheave member 12 in the first rotational direction relative to the hub member 16 will bias an unwinding of the coil spring 30 and deceleration of the sheave member 12 in the first rotational direction relative to the hub member 16 will bias a winding of the coil spring 30.

The unwinding of the coil spring 30 tends to increase the outward force of the coil spring 30 on the sheave engagement sleeve 22, thereby providing engagement, or "lock", of the sheave member 12 and the hub member 16. This engagement condition preferably occurs upon the acceleration of the sheave member 12 in the first rotational direction relative to the hub member 16. On the other hand, the winding of the coil spring 30 tends to decrease the outward force of the coil spring 30 on the sheave engagement sleeve 22, thereby allowing disengagement, or "slip", of the sheave member 12 and the hub member 16. This disengagement condition preferably occurs upon the deceleration of the sheave member 12 in the first rotational direction relative to the hub member 16.

During the "slip" condition of the over-running clutch pulley 10, the coil spring 30 will lightly rub across the sheave engagement sleeve 22. Similarly, during the "lock" condition of the over-running clutch pulley 10, the coil spring 30 will forcefully engage with the sheave engagement sleeve 22. Because the sheave engagement sleeve 22 is preferably made from a more wear resistant material than the sheave member 12, the sheave engagement sleeve 22 resists the wear caused by the coil spring 30. The coil spring 30 is preferably made from conventional materials, such as steel, and with conventional methods.

The over-running clutch pulley 10 of the preferred embodiments also includes a first bearing member 52, which functions to allow relative rotational movement of the sheave member 12 and the hub member 16. The first bearing member 52, which is preferably a rolling element type, preferably includes an outer race element 54 preferably press-fit mounted onto the sheave cartridge surface 24 of the sheave member 12, an inner race element 56 preferably press-fit mounted onto a hub cartridge surface 28 of the hub member 16, ball bearing elements 58 preferably located between the outer race element 54 and the inner race element 56, and a bearing seal 60 preferably extending between the outer race element 54 and the inner race element 56. The first bearing member 52 may alternatively be of other suitable types, such as a journal bearing or a roller bearing, may alternatively include other suitable elements, and may alternatively be mounted to other suitable surfaces with other suitable manners. The first bearing member 52 is preferably a conventional device and, as such, is preferably made from conventional materials and with conventional methods, but may alternatively be made from other suitable materials and with other suitable methods.

The over-running clutch pulley 10 of the preferred embodiments also includes a shield member 62, which functions to prevent contaminating particles, such as dirt, from entering the clutch cavity 50 and to keep lubricants from escaping the clutch cavity 50. Preferably, the coil spring 30 of the clutch cartridge 20 is located between the first bearing member 52 and the shield member 62. With the bearing seal 60 at one end and the shield member 62 at the other end of the coil spring 30, the coil spring 30 is substantially protected from contaminating particles. In the first preferred embodiment of the invention, as shown in FIG. 2A, the shield member 62 preferably fastens to and extends radially from the sheave member 12 to a portion of the hub attachment sleeve 26. In this embodiment, the shield member 62 is preferably made from conventional materials, such as plastic, and with conventional methods, but may alternatively be made from other suitable materials and from other suitable methods. In the second preferred embodiment, as shown in FIG. 2B, the shield member 62 is preferably a second bearing member 64, which extends radially to the sheave member 12'. The second bearing member 64, which is preferably similar to the first bearing member 52, includes a bearing seal 66 between an outer race element 68 and an inner race element 70. The outer race element 68, the bearing seal 66, and the inner race element 70 cooperate to form the shield member 62 in the second preferred embodiment. Like the first bearing member 52, the second bearing member 64 is preferably press-fit mounted between the sheave cartridge surface 24 of the sheave member 12' and the hub cartridge surface 28 of the hub member 16'. The second bearing member 64 is preferably a conventional device and, as such, is preferably made from conventional materials and with conventional methods, but may alternatively be made from other suitable materials and with other suitable methods.

As a person skilled in the art of over-running clutches will recognize from the previous detailed description and from the figures and claims, modifications and changes can be made to the preferred embodiment of the invention without departing from the scope of this invention defined in the following claims.

We claim:

1. An over-running clutch pulley for rotationally engaging an input device and an output device, comprising:

a sheave member defining a sheave input surface adapted to engage the input device, and defining a sheave cartridge surface;

a hub member defining a hub output surface adapted to engage the output device, and defining a hub cartridge surface; and a clutch cartridge including a sheave engagement sleeve contacting said sheave cartridge surface, a hub attachment sleeve contacting said hub cartridge surface, and a coil spring having a first end attached to said hub attachment sleeve, said coil spring being adapted to engage said sheave engagement sleeve upon the acceleration of said sheave member in a first rotational direction relative to said hub member and to disengage said sheave engagement sleeve upon the deceleration of said sheave member in the first rotational direction relative to said hub member.

2. The over-running clutch pulley of claim 1 wherein said hub member is concentrically located within said sheave member.

3. The over-running clutch pulley of claim 2 wherein said sheave cartridge surface has a substantially continuous cross-sectional area.

4. The over-running clutch pulley of claim 3 wherein said hub cartridge surface has a substantially continuous cross-sectional area.

5. The over-running clutch pulley of claim 1 wherein said sheave engagement sleeve is made from a more wear resistant material than said sheave member.

6. The over-running clutch pulley of claim 1 further comprising a first bearing member located between said sheave member and said hub member.

7. The over-running clutch pulley of claim 6 wherein said first bearing member is located adjacent said sheave cartridge surface and said hub cartridge surface.

8. The over-running clutch pulley of claim 6 further comprising a shield member extending radially from said sheave member; said coil spring being axially located between said first bearing member and said shield member.

9. The over-running clutch pulley of claim 8 wherein said shield member extends to said hub attachment sleeve.

10. The over-running clutch pulley of claim 8 wherein said shield member is a second bearing member located between said sheave member and said hub member.

11. The over-running clutch pulley of claim 10 wherein said first bearing member and said second bearing member are located adjacent said sheave cartridge surface and said hub cartridge surface.

12. An over-running clutch pulley for rotationally engaging an input device and an output device, comprising:

a sheave member defining a sheave input surface adapted to engage the input device, and defining a sheave cartridge surface;

a hub member defining a hub output surface adapted to engage the output device, and defining a hub cartridge surface; and a clutch cartridge including a sheave engagement sleeve coupled with said sheave cartridge surface, a hub attachment sleeve coupled with said hub cartridge surface, and a coil spring coupled with said sheave cartridge surface and with said hub attachment sleeve, said sheave engagement sleeve having first and second axial ends, said coil spring having an axial length substantially located within said sheave engagement sleeve axial ends, said coil spring adapted to engage said sheave engagement sleeve upon the acceleration of said sheave member in a first rotational direction relative to said hub member and to disengage said sheave engagement sleeve upon the deceleration of said sheave member in the first rotational direction relative to said hub member.

* * * * *